United States Patent [19]
Karpen et al.

[11] Patent Number: 5,430,285
[45] Date of Patent: Jul. 4, 1995

[54] ILLUMINATION SYSTEM FOR OPTICAL READER

[75] Inventors: Thomas W. Karpen, Skaneateles; Kenneth A. Wright, Syracuse; Gerard F. Beckhusen, Liverpool; Mark A. McClaude, Syracuse; William H. Lagerway, Auburn; Jeffrey B. Powers; Theresa M. West, both of Skaneateles, all of N.Y.

[73] Assignee: Welch Allyn, Inc., Skaneateles Falls, N.Y.

[21] Appl. No.: 109,735

[22] Filed: Aug. 20, 1993

[51] Int. Cl.6 .............................................. G06K 7/10
[52] U.S. Cl. ....................................... 235/472; 235/462
[58] Field of Search .................................. 235/462, 472

[56] References Cited

U.S. PATENT DOCUMENTS

| | | |
|---|---|---|
| 3,184,592 | 5/1965 | Cibie . |
| 4,570,057 | 2/1986 | Chadima, Jr. . |
| 4,673,804 | 6/1987 | Filauro . |
| 4,682,016 | 7/1987 | Inoue . |
| 4,891,739 | 1/1990 | Yasuda . |
| 4,971,410 | 11/1990 | Wike, Jr. . |
| 5,091,636 | 2/1992 | Takada . |
| 5,179,413 | 1/1993 | Griffith . |
| 5,187,353 | 2/1993 | Metlitsky . |
| 5,233,171 | 8/1993 | Baldwin .............................. 235/467 |

FOREIGN PATENT DOCUMENTS

63-56768  3/1988  Japan .

*Primary Examiner*—Davis L. Willis
*Assistant Examiner*—Peter J. Rashid
*Attorney, Agent, or Firm*—Harris Beach & Wilcox

[57] ABSTRACT

There is disclosed an apparatus for illuminating a sensing region having an object therein, comprising a reflector that is elongated in a first plane, the reflector having a width dimension that is less than a width dimension of a sensing region to be illuminated, and further having a first curved profile in the first plane about a center of curvature. In a preferred embodiment the reflector is disposed between the center of curvature and the sensing region. In a second plane which is orthogonal to the first plane and includes the center of curvature, a reflecting surface of the reflector has a second curved profile. A plurality of substantially Lambertian light sources each face the reflector for directing light thereto generally in a direction of the center of curvature for reflection toward the sensing region. The second profile preferably comprises a portion of an ellipse and a light source is disposed substantially at a primary focus thereof. The second profile preferably has a gap for transmitting retroreflected light generated within the sensing region therethrough. An upper portion of the second profile comprises a portion of a first surface of revolution selected from the group of ellipse and parabola, and the lower portion of the second profile can comprise a portion of a second surface of revolution selected from the group of ellipse and parabola, a light source being disposed at a focus of each of the first surface of revolution and the second surface of revolution. The assembly is combined in a scanner for reading optical patterns.

23 Claims, 7 Drawing Sheets

ILLUMINATION SYSTEM FOR OPTICAL READER

BACKGROUND OF THE INVENTION

1. Field of the Invention

This invention relates to illumination systems for optical readers such as bar code scanners. More particularly this invention relates to a reflector arrangement in an illumination system in a bar code scanner.

2. Description of the Prior Art

Modern bar code reading devices are required to read relatively wide bar code symbols while remaining in a stationary position at the instant of reading. It is also desirable that the system optics provide a large depth of field in order to read curved surfaces, or surfaces otherwise having uncertain displacement from the reading device, and to generally provide increased ease of reading. At the same time there is a need to conserve power, a goal which is limited by the requirements of the optics, the sensitivity of the photodetector, and the minimal acceptable signal-to-noise ratio.

In one prior art example, Chadima Jr. et al, U.S. Pat. No. 4,766,300, a portable bar code reader employs an elliptical reflector that is elongated in a width dimension of the bar code reader so as to illuminate a region located in front of an optical window and containing a bar code symbol. In this device light rays diverge from a flash tube illumination source toward a surface to be scanned, and are reflected in a receive path that passes above and beyond the reflector in a generally rearward direction. This arrangement results in a relatively large angle between the illumination path and the receive path. Also, across the scan width there is significant off-axis falloff of illumination intensity, which limits the ability to read indicia that are situated at the ends of a wide sensing region.

In Yasuda, U.S. Pat. No. 4,891,739, an optical arrangement is shown for uniformly illuminating a planar surface using a curved reflecting mirror by a non-Lambertian arcuate or point light source. A light shielding member is required to prevent light from the source from directly reaching the object to be illuminated.

SUMMARY OF THE INVENTION

It is therefore a primary object of the present invention to provide an improved optical illumination system that has a relatively small angle between the illumination and receive paths.

It is another object of the present invention to provide an improved illumination system that illuminates a field of view that is wider than the optical window of the scanner and operates with low off-axis falloff.

It is still another object of the present invention to provide an improved system for illuminating a wide field of view that operates with low power consumption.

These and other objects of the present invention are attained by an apparatus for illuminating a sensing region having an object therein, comprising a reflector that is elongated in a first plane, the reflector having a width dimension that is less than a width dimension of a sensing region to be illuminated, and further having a first curved profile in the first plane about a center of curvature. In one aspect of the invention the reflector is disposed between the center of curvature and the sensing region. In a second plane which is orthogonal to the first plane and includes the center of curvature, a reflecting surface of the reflector has a second curved profile. A plurality of substantially Lambertian light sources each face the reflector for directing light thereto generally in a direction of the center of curvature for reflection toward the sensing region. A Lambertian source is one whose radiance is completely independent of viewing angle. Radiance means power per unit project area per unit solid angle.

The second profile may comprise a portion of an ellipse and a light source is disposed substantially at a primary focus thereof.

In accordance with another aspect of the invention, the second profile has a gap for transmitting retroreflected light from the sensing region therethrough, the gap defining an upper and a lower portion of the second profile. The upper portion of the second profile comprises a portion of a first surface of revolution selected from the group of ellipse and parabola, or can be a flat planar surface, and the lower portion of the second profile comprises a portion of a second surface of revolution selected from the group of ellipse and parabola, a light source being disposed at a focus of each of the first surface of revolution and the second surface of revolution. The foci of the first and second surfaces of revolution can be congruent.

In yet another aspect of the invention an optical scanner for reading externally located indicia that are disposed in a sensing region comprising a housing having a median longitudinal plane and a scanning axis in a cross-longitudinal plane; a source of illumination; an elongated reflector aligned generally in the scanning axis for reflecting light incident thereon, the light travelling along a path extending to the reflector from the source of illumination, and being reflected generally toward the sensing region, the reflector being elongated generally along the scanning axis, and having a central portion, two end portions, a focal line connecting a plurality of primary focal points, a reflecting profile in a plane orthogonal to the focal line, the source of illumination being disposed in the focal line; window means in the housing for transmitting the reflected light to illuminate the sensing region and for admitting light from without the scanner therethrough, a frontal plane orthogonal with the median longitudinal plane being defined at an intersection of the median longitudinal plane with the window means; a photodetector disposed in the housing in a path of the admitted light and producing an output responsive thereto; and optical means disposed in a path of the admitted light for projecting an image of the indicia onto the photodetector; wherein the improvement comprises: a displacement of each the end portion from the frontal plane differing from a displacement of the central portion therefrom. The reflecting profile is nonlinear, and can be a portion of an ellipse. In one embodiment the source of illumination comprises a plurality of quasi-monochromatic light emitting diodes.

In another aspect of the invention the reflecting profile comprises continuous surface that comprises a first reflecting profile in a plane extending through a first light emitting diode and a second reflecting profile in another plane extending through a second light emitting diode, the first reflecting profile and the second reflecting profile having non-identical configurations.

In another aspect of the invention the reflecting profile has a gap disposed in the path of admitted light for transmission of the admitted light therethrough, the gap defining an upper and a lower portion of the reflecting profile. The upper profile and the lower profile can be elliptical or parabolic in any combination.

In yet another aspect of the invention the reflector has a curvature in the cross-longitudinal plane, that can comprise an arc of a circle. The displacement of each of the end portions from the frontal plane can exceed the displacement of the central portion therefrom.

In another aspect of the invention, the displacement of each of the end portions from the frontal plane is less than the displacement of the central portion therefrom.

In still another aspect of the invention the reflector has a central portion and two angulated end portions, the central portion and the end portions being linear in the cross-longitudinal plane.

BRIEF DESCRIPTION OF THE DRAWING

For a better understanding of these and other objects of the present invention, reference is made to the detailed description of the invention which is to be read in conjunction with the following drawings, wherein.

In the drawings wherever circuits require a power source, it is assumed for the purpose of simplifying the diagrams that a source of the correct electrical power is provided.

The terms horizontal plane, and frontal plane are used as relative planes of references in the text describing the Drawing, it being understood that these terms do not limit the physical disposition or orientation of the components wherein such planes appear.

DESCRIPTION OF THE PREFERRED EMBODIMENT

Figure 1:
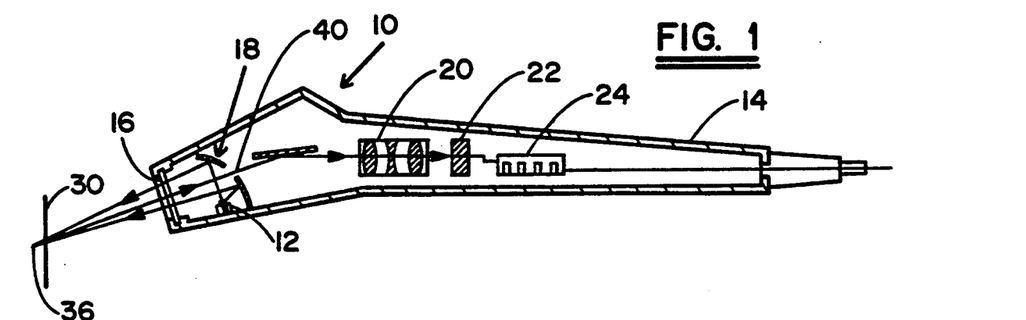
FIG. 1 is a partially schematic sectional view taken through a median longitudinal plane of a bar code scanner incorporating an optical arrangement in accordance with the invention.

In FIG. 1 there is shown a side view of an embodiment of the invention in conjunction with a bar code reader 10, which could be hand-held, or machine mounted as desired for a particular application. A housing 14 contains other functional components of the reader. A substantially Lambertian light source 12, preferably a plurality of light emitting diodes (LEDs), is disposed in a frontal portion of the housing. While the LEDs are not ideal Lambertian sources due to the reflector found within the LED packaging, they have substantially Lambertian characteristics. The LEDs emit light toward a reflector 18, which reflects light incident thereon through a window 16 in the nose of the housing. As the Lambertian sources project light into a $2\pi$ steradian solid angle, that is all the light energy radiates into the forward directed hemisphere, it is not required to provide a light shielding member to prevent the light from shining directly on the target and producing an undesired pattern of illumination. It is advantageous that the LEDs are quasi-monochromatic. They should be configured to radiate in the region of the spectrum appropriate to the application. In bar code reading applications, 660 nm LEDs are suitable. The use of band pass filters is thus avoided. It has been found that providing a plurality of LEDs as a light source has an important economic advantage as well. They can be flexibly disposed and therefore can readily be arranged to conform to a variety of reflector radii with low incremental manufacturing costs. Furthermore they are durable, efficient, and operate with low power drain as compared with xenon lamps as taught in the prior art. The ability to operate under low power drain is due in part to the intrinsic conversion efficiency of the LEDs, and in part to their monochromaticity which allow for maximum transfer of light from the source to the target without losses through radiation outside the desired region of the spectrum.

Figure 11:
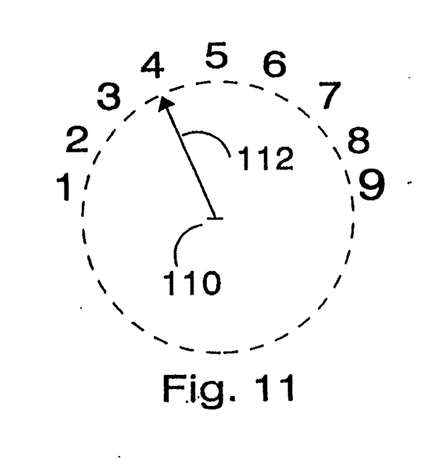
FIGS. 11 and 12 are diagrams indicating the radiance of a point source in accordance with the prior art.
Figure 12:
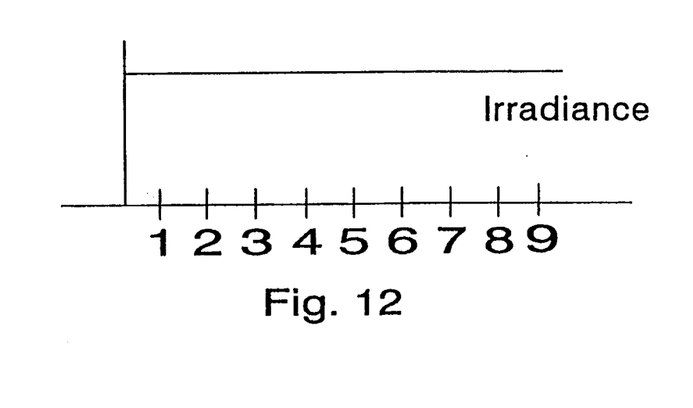

The difference between the illuminating characteristics of a uniformly emitting light source as known from the above-noted Yasuda patent, for example, and the Lambertian sources in accordance with the invention can be appreciated with reference to FIGS. 11-14. In FIG. 11 a uniformly emitting point source 110 emits light whose intensity is sampled by a suitable detector at positions 1-9, all equidistant from the source 110. In FIG. 11 an light ray directed toward position 4 is indicated by arrow 112. The results of the irradiance measurements are plotted in FIG. 12, wherein the readings are constant for all sampled positions.

Figure 13:
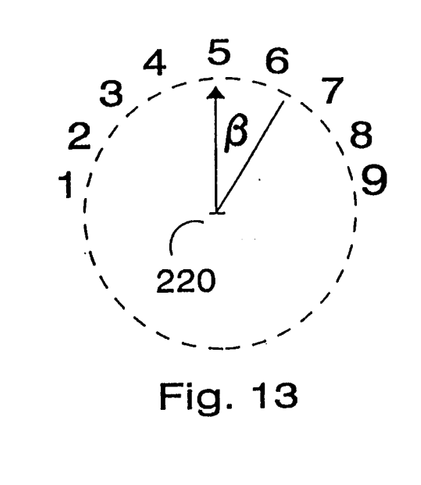
FIGS. 13 and 14 are diagrams indicating the radiance of a Lambertian source.
Figure 14:
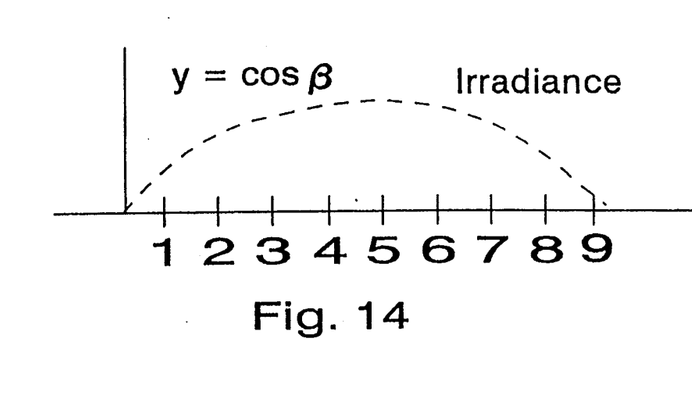

In FIG. 13 a Lambertian source 220 is directed at position 5, and irradiance measurements taken are taken by a detector equidistantly positioned at various viewing angles $\beta$ from position 5 at positions 1-9, an exemplary angle $\beta$ being shown in FIG. 13. The results of these measurements are plotted in FIG. 14, wherein the readings vary as the cosine of $\beta$. Although not shown in the plot, readings taken at angles beyond positions 1 and 9 would be zero.

The window 16 transmits light from the reflector to illuminate an external sensing region 30 that contains indicia on a surface or substrate, such as a bar code symbol. Region 30 is shown as a volume having a line 31 of best image. Window 16 also admits light scattered or reflected from the sensing region 30 which carries an optical pattern of the indicia in the sensing region 30 into the interior of the housing 14. The admitted light continues through receive optics 20 which project an image of the indicia onto a photodetector 22, preferably a CCD array. Mirror 19 may be included to allow the optical path to conform to the housing 14. The photodetector 22 generates a signal responsive to the luminous intensity of the light incident thereon. This signal is coupled to suitable electronics 24 for further signal processing, for example amplification, analog-to-digital conversion, and digitization. Electronics 24 may include a decoder and a microprocessor for interpreting information in the signal received from the photodetector. The housing 14, mirror 19, optics 20, photodetector 22, and the electronics 24 are well known in the art. As they do not form a part of the invention, they will not be further discussed herein. The purpose of the housing 14 is to provide mechanical support for the other functional components, and to shield the photodetector from light other than the admitted light from the sensing region 30. The invention can equally be practiced in embodiments wherein one or more of the optics 20, electronics 24, light source 12, and the reflector 18 are disposed outside the housing 14.

Figure 7:
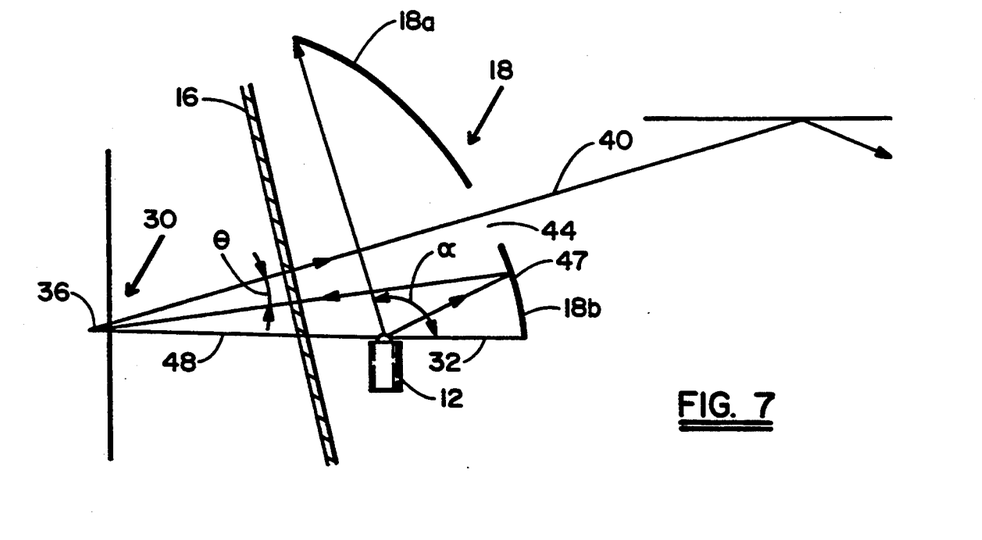
FIG. 7 is another diagram of a reflector which is helpful in understanding the invention.

As best seen in FIG. 1, reflector 18 has a curved reflecting profile in the plane shown, which is preferably an ellipse. Light source 12 is disposed substantially at a primary focal point thereof, and has its luminous surface directed toward the reflector 18. With reference to FIG. 7, it is desirable that the collection angle α, subtended by extreme light rays 32, 34 extending from the light source 12 to the reflector 18, be at least 120°. Light is also collected by the reflector 18 in planes other than that shown in FIG. 1 and is generally directed toward the sensing region. Reflector 18 directs the light from light source 12 onto a substrate within sensing region 30, disposed generally at a secondary focal point 36 from which some of it returns toward the window 16 along a receive light path 40, passing through a gap 44 in the reflector 13 toward the optics 20. It is convenient to explain the advantages of the gap 44 with reference to an angle θ defined by the intersection of light path 40 with the major axis of the ellipse, indicated by light ray 32 and its leftward continuation as dotted line 48 (also shown in FIGS. 15–16). In the known prior art devices, receive path 40 passes above the reflector 18, so that θ is relatively large. Providing gap 44 in the reflector 18 allows a smaller angle θ. This has the important advantage of increasing the overlap (shown as shaded areas 165, 175 in FIGS. 15 and 16) between the field of illumination and field of view of the photodetector 22 (the region of sensitivity) and thereby increasing the signal strength reaching the photodetector. The signal-to-noise ratio and the rate of valid first reads is thus improved.

Figure 6:
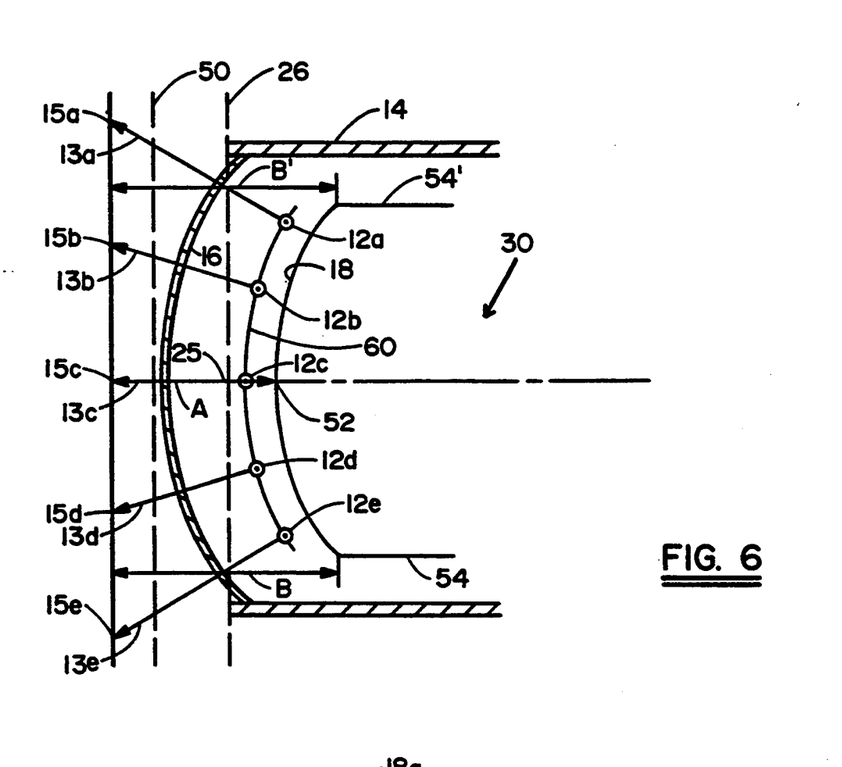
FIG. 6 is a detailed sectional diagrammatic view of the reflector shown in FIGS. 3 and 4.

Turning now to FIGS. 6 and 7, the frontal portion of the scanner is shown in greater detail. A median longitudinal plane 25 and a cross-longitudinal plane 26 are indicated for reference. A frontal plane 50 parallel to cross-longitudinal plane 26 is shown at the intersection of window 16 and plane 25. The window 16 is not necessarily coplanar with plane 50, but can be realized as an angulated or curved sheet of transparent material. However window 16 can equally be a non-curved surface, or can even be an open port. Reflector 18 is elongated in the width dimension of the housing 14, corresponding to the scanning or reading direction, and has a central portion 52 and end portions 54, 54'. Light source 12 is realized as a plurality of LEDs 12a–12e each disposed at a primary focus of the elliptical surface. The reflecting surface is not linear in an intersection with a nominally horizontal plane orthogonal to cross-longitudinal plane 26, but is curved backward, such that the displacement A of central portion 52 from the frontal plane 50 is less than either of the displacements B, B' of the end portions 54, 54' therefrom. In the preferred embodiment the curvature in the plane of elongation is a circle. The curvature can be adjusted in accordance with the requirements of a given application. Also the curvature need not be circular, but can be any curved shape, or even a series of angulated straight lines. Viewed as a whole, the reflecting surface thus has a saddle-like configuration. A focal line 60 connecting LEDs 12a–12b preferably follows the horizontal curvature of the reflecting surface. It is possible to adjust the parameters of the ellipse, however, so that line 60 does not track the reflecting surface, but has another configuration in order so that the secondary foci of reflector 18 conform to a geometry of a particular sensing region. The purpose of the backward horizontal curvature is to direct reflected light laterally in order to achieve a divergent illumination of a sensing region that is wider than window 16 without substantial off-angle image irradiance falloff. There should be sufficient horizontal curvature to assure a degree of divergence of the illumination that exceeds the intrinsic divergence of the LED itself. Considering now a particular LED 12e which faces end portion 54' of reflector 18, and again with reference to FIG. 1, light originating from the LED 12e and striking the reflecting surface of reflector 18 is primarily redirected in the sectional plane of the elliptical profile through the window 16 as ray 13e. Ray 13e diverges at a substantial angle with the median longitudinal plane 25 to strike a point 15e located near the extreme lateral end of sensing region 30. In like manner LED 12c, disposed opposite central portion 52 of reflector 18 casts a light ray 13c which strikes point 15c, near the central portion of sensing region 30. Sensing region 30 is preferably displaced from the secondary focus 36 to achieve a broader dispersal of light on the sensing region. Reflector 18 is constructed by well known techniques, such as plastic injection molding. Vacuum electro-deposition of aluminum plating is suitable for providing the reflecting surface. The structure of the reflector is provided with conventional adaptations (not shown) for mounting in the housing 14. By way of non-exclusive examples, these could be brackets, apertures for screws, bolts or rivets, weldments or adhesives as appropriate for the working environment of the device. The LEDs 12a–12e can be mounted on a suitably configured circuit board having suitable pins or similar provisions for electrical power.

The following table indicates dimensions which work well in a prototype device in accordance with the above embodiment for reading bar code symbols exceeding 50 mm in length. In the table all dimensions are in inches, and are measured with respect to the reflecting surface.

TABLE 1

| | |
|---|---|
| Semi-major Axis | 2.500 |
| Semi-minor Axis | 0.500 |
| Radius of horizontal curvature | 10.000 |

Figure 4:
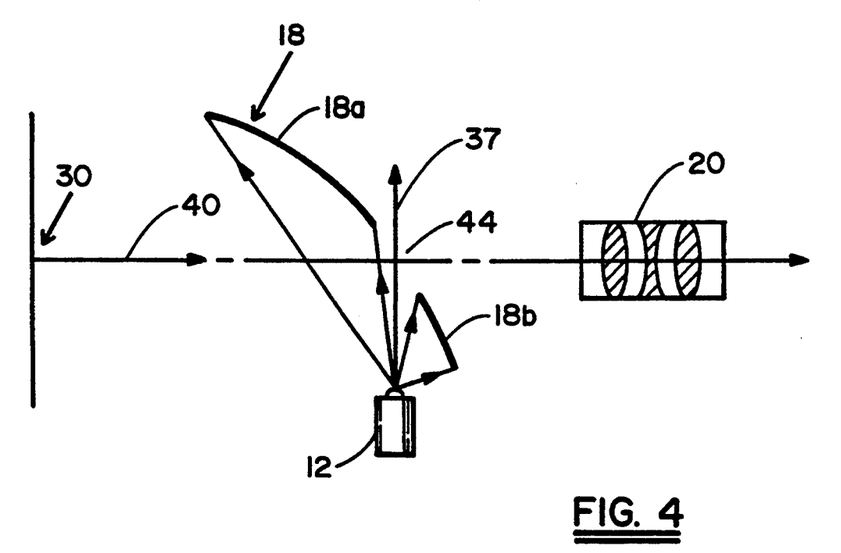
FIGS. 4 and 5 are sectional diagrammatic views indicating two alternate embodiments of a reflector in accordance with the invention.

In FIG. 4 a reflector 18 is shown in greater detail, and is divided into an upper portion 18a and a lower portion 18b, the two separated by gap 44. Portions 18a and 18b may be continuations of the same elliptical profile. Light originating from one focus of an ellipse converges at the other focus. However either or both portions 18a, 18b can be parabolic, in which case the light source 12 is disposed at the focus or foci thereof. A parabolic reflector having a light source at its focus will of course direct parallel beams of light toward the sensing region, and produce a relatively uniform light distribution thereon. The distribution will not be entirely uniform, as the light source 12 is not an ideal point, but has finite spatial dimensions.

Figure 15:
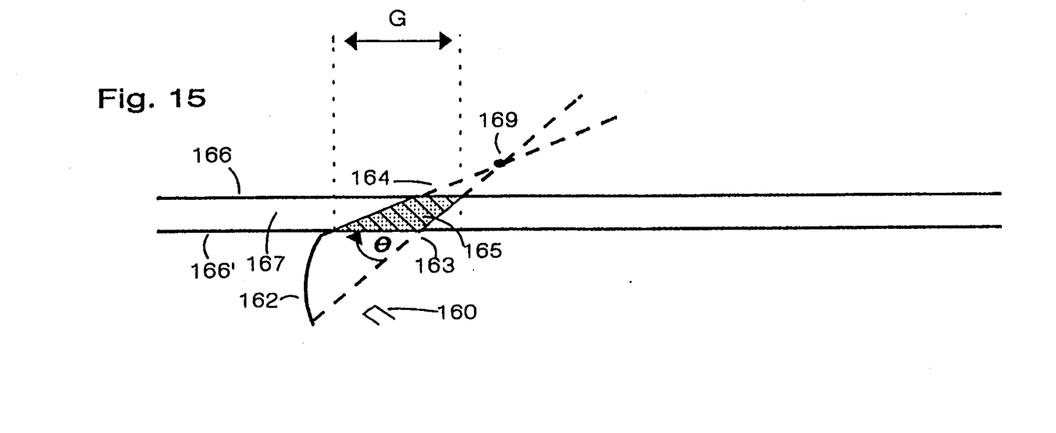
FIGS. 15 and 16 are diagrams indicating certain performance characteristics of optical assemblies in accordance with alternate embodiments of the invention.
Figure 16:
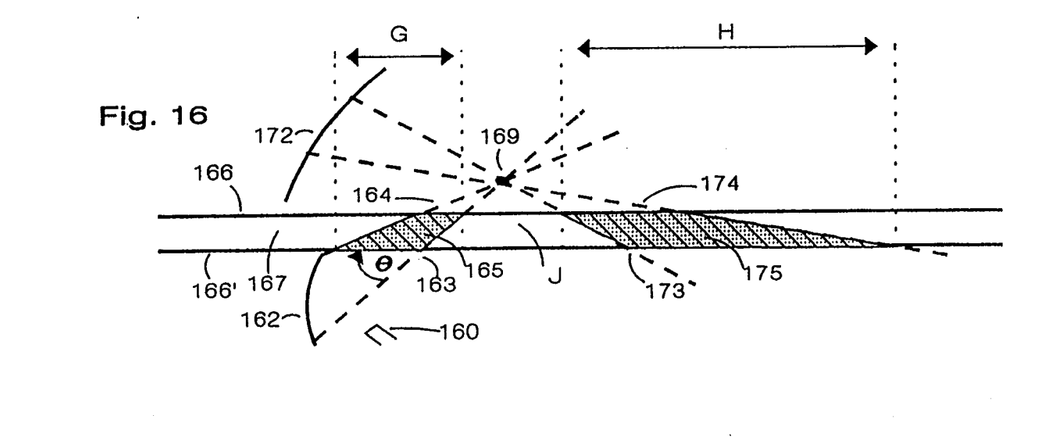

The advantages of the gap 44 can be appreciated with reference to FIGS. 15 and 16. In FIG. 15 a source 160 is positioned at the near focal point of an elliptical reflector 162 and shines thereon. A reflected light beam, indicated by marginal rays 163, 164 converges to a secondary focal point 169 disposed on the major axis of the ellipse. A receive path 167 is defined by parallel lines 166, 166', which extends to a photodetector (not shown). An object positioned in the shaded region 165 will be illuminated and cast reflected light along the receive path. This arrangement provides a functional depth of field indicated by dimension G. FIG. 16 shows the same arrangement as FIG. 15, except now reflector 169 is augmented by a second elliptical reflector 172, which is displaced upward a distance corresponding to the width of receive path 167 and has its near focal point at light source 160. Light originating from the source 160 reflects from reflector 172 and defines a beam indicated by marginal rays 173, 174, which converges substantially at point 169 and then passes through the receive path 167 to define a region 175. In this arrangement objects located in region 165 and region 175 will be illuminated by light reflecting from reflector 162 and reflector 162 respectively, and will retroreflect light along the receive path 167. It is apparent that the functional depth of field represented in FIG. 16 by dimension G is now discontinuously augmented by the width dimension H of region 175. In FIGS. 15 and 16 the source 160 is an ideal point source; however in practice it has finite dimensions that increase the size of shaded regions 165, 175 and tend to eliminate the intermediate zone J therebetween.

Figure 5:
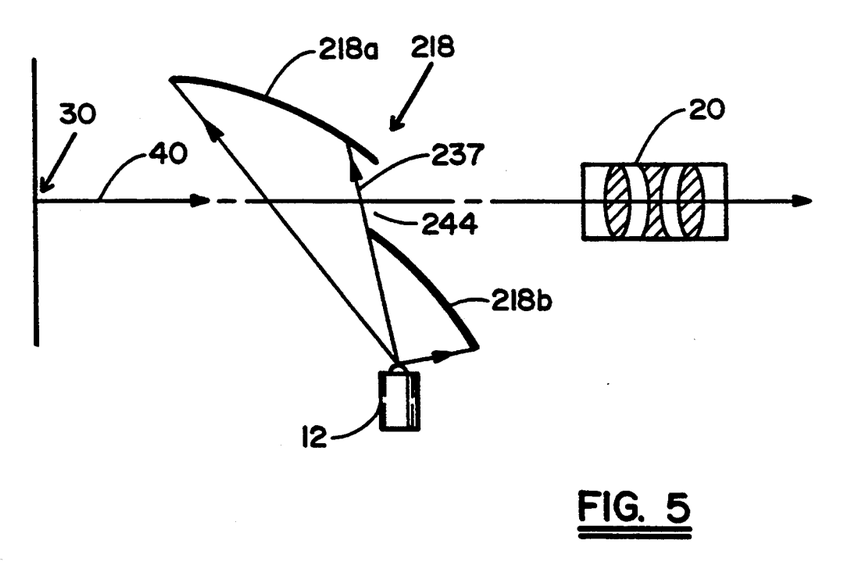

In FIG. 5 there is shown a first alternate embodiment of the reflector, in which elements differing from the embodiment of FIG. 4 have reference numerals advanced by 200. In FIG. 4 an exemplary light ray 37 passes from light source 12 through the gap 44 and fails to be reflected toward the sensing region. The light energy carried by light ray 37 thus does not contribute to the illumination of the sensing region 30, and reduces the global efficiency of the arrangement. In FIG. 5 The gap 244 is occulted by the lower portion 218b of the reflector 218, so that no light energy is lost therethrough. In this embodiment portions 218a and 218b may also be ellipses or parabolas in any combination. It is necessary that the equations describing curved surfaces 218a and 218b differ in order to assure that light source 12 remains at the foci or primary foci of the respective ellipses and parabolas as the case may appear.

Figure 2:
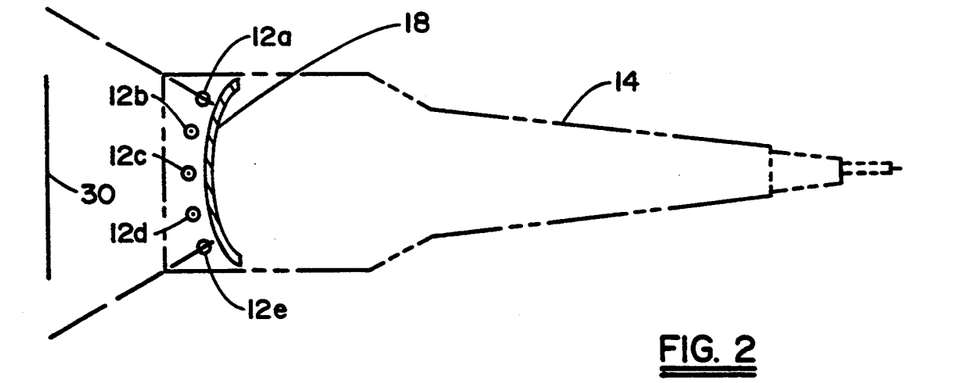
FIG. 2 is a sectional view of the device shown in FIG. 1 with details omitted take in a cross-longitudinal plane orthogonal to the plane of FIG. 1.
Figures 8, 9:
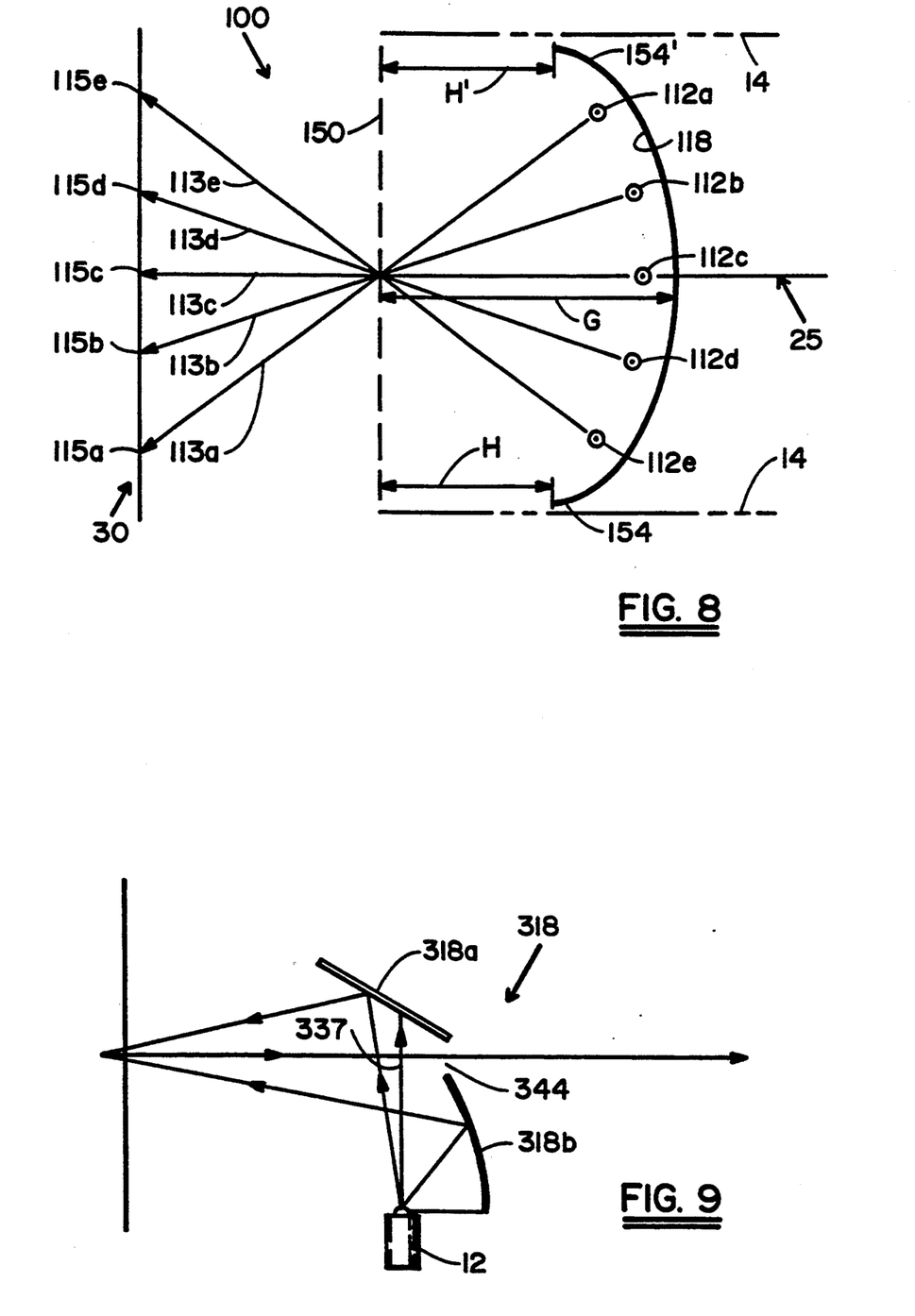
FIG. 8 is a diagram of yet another embodiment of the invention taken in the same plane as the reflector shown in FIG. 6.
FIGS. 9 and 10 are sectional diagrammatic views of alternate embodiments of a reflector.

In FIG. 9 there is shown a second alternate embodiment of the invention, wherein elements differing from those in FIG. 4 have reference numerals advanced by 300. This embodiment is similar to the embodiment of FIG. 5, except that now the top portion 318a of reflector 318 is a flat surface in profile, while lower portion 318b can be elliptical or parabolic. As discussed in the first embodiment herein, the reflector 318 is curved or angulated in a horizontal plane as shown in FIGS. 2 and 3.

Figure 3:
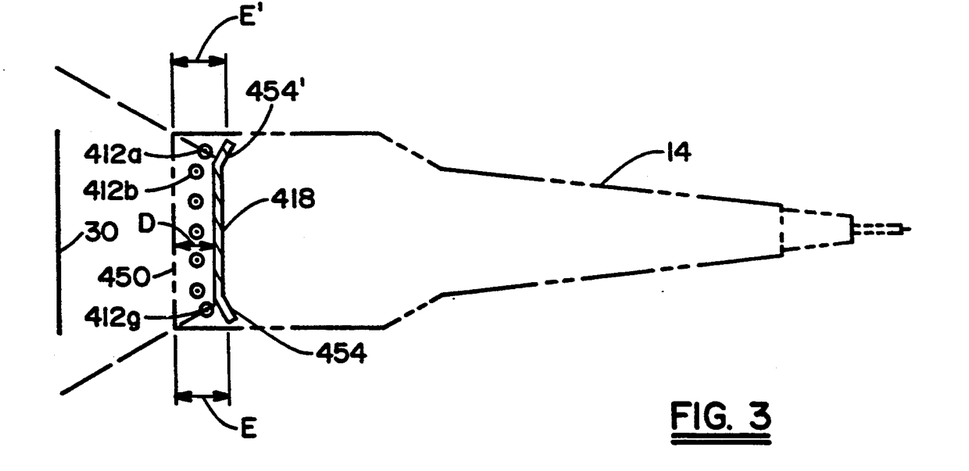
FIG. 3 is a top plan view of an alternate embodiment of the invention.

Turning now to FIG. 3, there is illustrated a third alternate embodiment of the invention, wherein a reflector 418 has a linear central portion 452 and two angulated end portions 454, 454'. LEDs 412a and 412e throw light onto end portions 454' and 454 respectively for reflection toward off axis end portions of the sensing region 30. In like manner LEDs 412b, 412e face the central portion 452 and contribute primarily to illuminating the central portion of the sensing region 30. In this embodiment the central portion 452 and frontal plane 450 are separated by a dimension D, while dimensions E, E' separate end portions 454, 454' from the frontal plane 450 respectively. Dimension D must be less than either of the dimensions E, E'.

In FIG. 8, a fourth alternate embodiment of the invention is shown. A reflector 118 in profile can have any of the configurations described previously, but it has a reversed horizontal curvature. Reflector 118 has a central portion separated from frontal plane 150 by a dimension G, and end portions 154, 154' respectively separated from frontal plane 150 by dimensions H, H'. In this embodiment dimension G exceeds either dimension H, H'. LEDs 112a-112e are distributed facing the reflecting surface of reflector 118, and produce light rays 113a-113e, which fall on sensing region 30 at points 115a-115e respectively. For a particular LED, which is offset from the median longitudinal plane 25, such as LED 112a, incident point 115a lies on the opposite side of the plane 25. If the sensing region 30 is itself linear, as shown in FIG. 8, the equations of the elliptical profiles in the planes of the light rays 113a, 113b may vary accordingly, so that the secondary foci are flat field compensated. This embodiment can be constructed in a narrow, relatively tall housing 14, and may be advantageous in certain applications where the dimensions of the bar code reader are restricted, and to enable the operator to visualize the lateral portions of the sensing region 30 during a reading operation.

Figure 10:
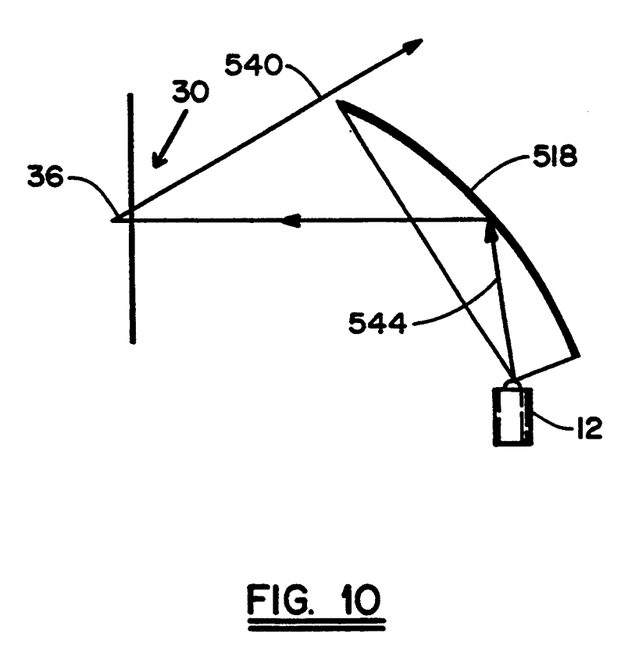

A fifth alternate embodiment of the invention is illustrated in FIG. 10. This is generally similar to the embodiment of FIG. 4, except that the reflector 518 lacks gap 44. The receive light path 40 clears the top surface of the reflector. This embodiment has the advantage of simplified construction to avoid light loss, but lacks the advantages of the gap, discussed above.

While this invention has been explained with reference to the structure disclosed herein, it is not confined to the details set forth and this application is intended to cover any modifications and changes as may come within the scope of the following claims:

What is claimed is:

1. An apparatus for illuminating a sensing region having an object therein, comprising:
   a reflector that is elongated in a first plane, said reflector having a width dimension that is less than a width dimension of a sensing region to be illuminated, and further having a first curved profile in said first plane about a center of curvature, said reflector being disposed between said center of curvature and the sensing region, a reflecting surface of said reflector further comprising a second curved profile in a second plane that is orthogonal to said first plane and includes said center of curvature;
   a plurality of substantially Lambertian light sources, each facing said reflector for directing light thereto for reflection toward the sensing region.

2. The apparatus in accordance with claim 1, wherein said second profile comprises a portion of an ellipse and a said light source is disposed substantially at a primary focus thereof.

3. The apparatus in accordance with claim 1, wherein said second profile comprises a portion of an parabola and a said light source is disposed substantially at a focus thereof.

4. The apparatus in accordance with claim 1, wherein said second profile has a gap for transmitting retroreflected light from the sensing region therethrough, said gap defining an upper and a lower portion of said second profile.

5. The apparatus in accordance with claim 4, wherein said upper portion of said second profile comprises a portion of a first surface of revolution selected from the group of ellipse and parabola, and said lower portion of said second profile comprises a portion of a second surface of revolution selected from the group of ellipse and parabola, a said light source being disposed at a focus of each of said first surface of revolution and said second surface of revolution.

6. The apparatus in accordance with claim 4, wherein said upper portion of said second profile comprises a planar surface, and said lower portion of said second profile comprises a portion of a second surface of revolution selected from the group of ellipse and parabola, a said light source being disposed at a focus of said second surface of revolution.

7. An optical scanner for reading externally located indicia that are disposed in a sensing region comprising:
- a housing having a median longitudinal plane and a scanning axis disposed in a cross-longitudinal plane;
- a source of substantially Lambertian illumination;
- an elongated reflector aligned generally in said scanning axis for reflecting light incident thereon, said reflector having a width dimension that is less than a width dimension of a sensing region to be illuminated, said light travelling along a path extending to said reflector from said source of illumination, and being reflected generally toward the sensing region, said reflector being elongated generally along said scanning axis, and having a central portion, two end portions, a focal line connecting a plurality of primary focal points, a reflecting profile in a plane orthogonal to said focal line, said source of illumination being disposed in said focal line;
- window means in said housing for transmitting said reflected light to illuminate the sensing region and for admitting light from said sensing region therethrough, a frontal plane orthogonal with said median longitudinal plane being defined at an intersection of said median longitudinal plane with said window means, a displacement of each said end portion from said frontal plane differing from a displacement of said central portion therefrom;
- a photodetector disposed in said housing in a path of said admitted light and producing an output responsive thereto; and
- optical means disposed in a path of said admitted light for projecting an image of the indicia onto said photodetector.

8. The scanner in accordance with claim 7, wherein said reflecting profile is nonlinear.

9. The scanner in accordance with claim 8, wherein said source of illumination comprises a plurality of light emitting diodes.

10. The scanner in accordance with claim 9, wherein said reflecting profile comprises a first reflecting profile in a first plane including a first light emitting diode and a second reflecting profile in a second plane including a second light emitting diode, said first reflecting profile and said second reflecting profile having non-identical configurations in said first and second planes.

11. The scanner in accordance with claim 7, wherein said reflecting profile has a gap disposed in said path of admitted light for transmission of said admitted light therethrough, said gap defining an upper and a lower portion of said reflecting profile.

12. The scanner in accordance with claim 11, wherein said upper portion of said reflecting profile is parabolic, and said lower portion of said reflecting profile is elliptical.

13. The scanner in accordance with claim 11, wherein said upper portion of said reflecting profile is linear, and said lower portion of said reflecting profile is elliptical.

14. The scanner in accordance with claim 11, wherein said upper portion of said reflecting profile is linear, and said lower portion of said reflecting profile is parabolic.

15. The scanner in accordance with claim 7, wherein said reflector has a curvature in said cross-longitudinal plane.

16. The scanner in accordance with claim 15, wherein said curvature comprises an arc of a circle.

17. The scanner in accordance with claim 7, wherein said reflector has a central portion and two angulated end portions, said central portion and said end portions being linear in said cross-longitudinal plane.

18. The scanner in accordance with claim 7, wherein said displacement of each said end portion from said frontal plane exceeds said displacement of said central portion therefrom.

19. The scanner in accordance with claim 7, wherein said displacement of each said end portion from said frontal plane is less than said displacement of said central portion therefrom.

20. An optical scanner for reading externally located indicia that are disposed in a sensing region comprising:
- a housing having a median longitudinal plane and a scanning axis in a cross-longitudinal plane;
- a source of substantially Lambertian illumination comprising a plurality of quasi-monochromatic light emitting diodes;
- an elongated reflector aligned generally in said scanning axis for reflecting light incident thereon, said reflector having a width dimension that is less than a width dimension of a sensing region to be illuminated, said light travelling along a path extending to said reflector from said source of illumination, and being reflected generally toward the sensing region, said reflector being elongated generally along said scanning axis, and having a central portion, two end portions, a focal line connecting a plurality of primary focal points, and a nonlinear reflecting profile in a plane orthogonal to said focal line, said light emitting diodes being disposed in said focal line;
- window means in said housing for transmitting said reflected light to illuminate the sensing region and for admitting light from without the scanner therethrough, a frontal plane orthogonal with said median longitudinal plane being defined at an intersection of said median longitudinal plane with said window means, said reflecting profile having a gap disposed in said path of admitted light for transmission of said admitted light therethrough, said gap defining an upper and a lower portion of said reflecting profile;
- a photodetector disposed in said housing in a path of said admitted light and producing an output responsive thereto; and optical means disposed in a path of said admitted light for projecting an image of the indicia onto said photodetector;

said reflector having a curvature in said cross-longitudinal plane, and a displacement of each said end portion from said frontal plane exceeding a displacement of said central portion therefrom.

21. The scanner in accordance with claim 20, wherein said upper portion of said reflecting profile is parabolic, and said lower portion of said reflecting profile is elliptical.

22. The scanner in accordance with claim 20, wherein said upper portion of said reflecting profile is elliptical and said lower portion of said reflecting profile is parabolic.

23. The scanner in accordance with claim 20 wherein said upper portion of said reflecting profile is linear, and said lower portion of said reflecting profile is elliptical.

* * * * *